US009482804B2

(12) United States Patent
Hirose et al.

(10) Patent No.: US 9,482,804 B2
(45) Date of Patent: Nov. 1, 2016

(54) RELAY

(71) Applicant: OMRON Corporation, Kyoto-shi, Kyoto (JP)

(72) Inventors: Yuji Hirose, Kyoto (JP); Masayuki Shinohara, Kyoto (JP); Yasuhiro Tanoue, Shiga (JP); Hiroyuki Miyamoto, Shiga (JP); Yoshimasa Osumi, Kyoto (JP); Kazuhide Hirota, Shiga (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 14/609,718

(22) Filed: Jan. 30, 2015

(65) Prior Publication Data

US 2015/0234109 A1 Aug. 20, 2015

(30) Foreign Application Priority Data

Feb. 19, 2014 (JP) ................ 2014-030041

(51) Int. Cl.
| | | |
|---|---|---|
| F21V 7/04 | (2006.01) | |
| F21V 11/00 | (2015.01) | |
| G02B 5/02 | (2006.01) | |
| F21V 8/00 | (2006.01) | |

(52) U.S. Cl.
CPC ........... *G02B 6/0008* (2013.01); *G02B 5/0226* (2013.01)

(58) Field of Classification Search
CPC ................ G02B 6/0008; G02B 5/0226
USPC .............. 340/641, 644, 815.42, 815.45
See application file for complete search history.

(56) References Cited

U.S. PATENT DOCUMENTS

| | | | | |
|---|---|---|---|---|
| 5,515,243 A | * | 5/1996 | Cassarly ............. | G02B 6/0008 362/298 |
| 7,675,426 B2 | | 3/2010 | Takada et al. | |
| 2006/0002678 A1 | * | 1/2006 | Weber ................ | G02B 6/0008 385/146 |
| 2008/0224878 A1 | * | 9/2008 | Takada ............... | H01H 50/08 340/644 |
| 2014/0126237 A1 | * | 5/2014 | Morino ............... | G02B 6/0018 362/607 |
| 2014/0192556 A1 | * | 7/2014 | Shin .................... | G02B 6/0018 362/611 |

FOREIGN PATENT DOCUMENTS

| | | |
|---|---|---|
| CN | 1981216 A | 6/2007 |
| CN | 101076873 A | 11/2007 |
| CN | 101706084 A | 5/2010 |
| JP | S54183658 U | 12/1979 |
| JP | 4319973 B2 | 8/2009 |

OTHER PUBLICATIONS

Office Action in counterpart Chinese Patent Application No. 201510040065.3 on Jul. 5, 2016 (22 pages).

* cited by examiner

*Primary Examiner* — Donald Raleigh
(74) *Attorney, Agent, or Firm* — Osha Liang LLP

(57) ABSTRACT

A relay has a case, a relay body disposed in the case, a light source disposed in the case that emits light in accordance with an operation of the relay body, a light guide path which that receives, via a first end surface, the light emitted from the light source, and causes the light to exit outward from a second end surface, and a diffusion structure disposed in an optical path of the light which exits from the second end surface of the light guide path.

14 Claims, 16 Drawing Sheets

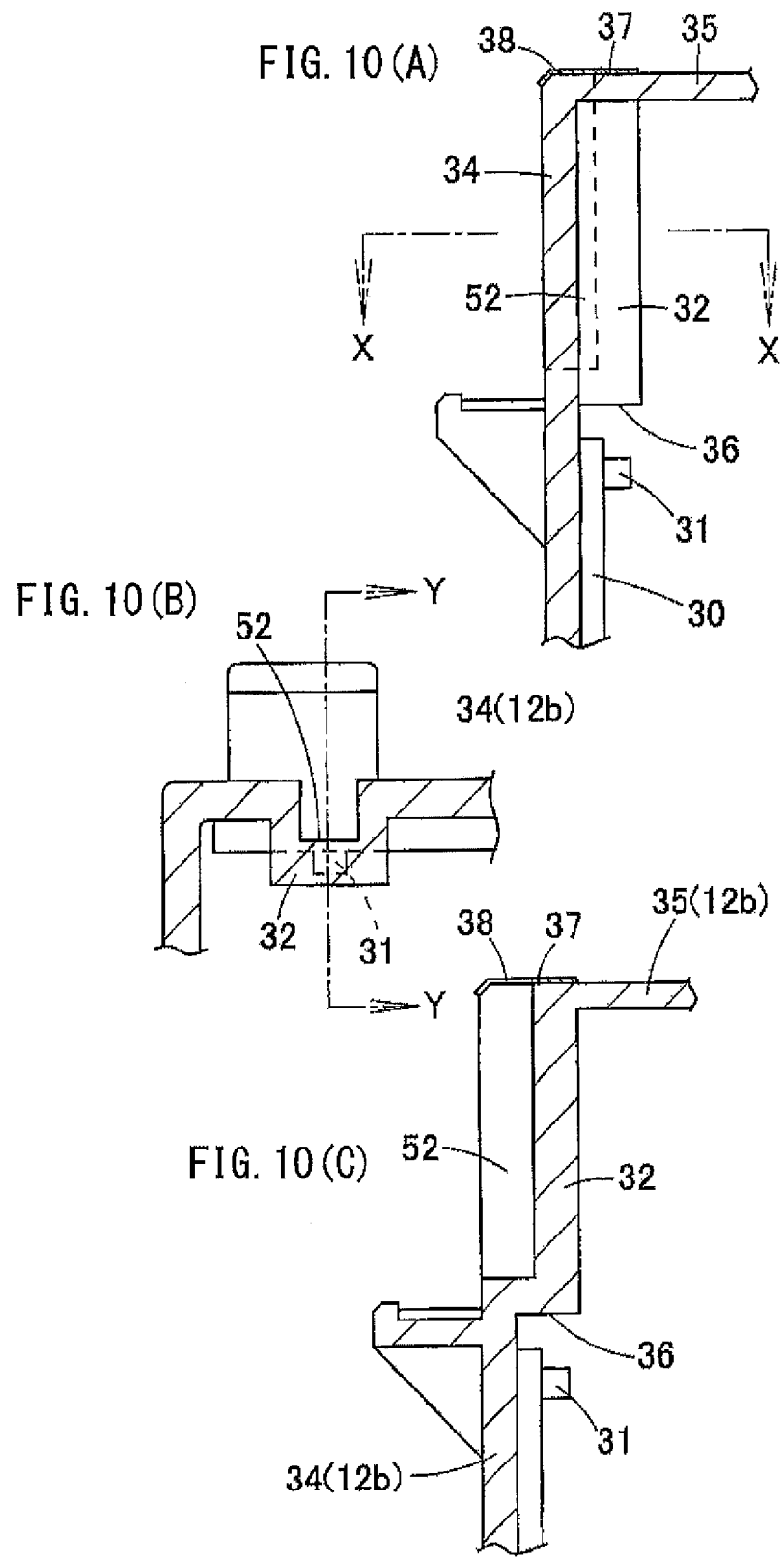

RELAY

CROSS-REFERENCE TO RELATED APPLICATIONS

This Nonprovisional application claims priority under 35 U.S.C. §119(a) on Patent Application No. 2014-030041 filed in Japan on Feb. 19, 2014, the entire contents of which are hereby incorporated by reference.

BACKGROUND

1. Technical Field

The present invention relates to a relay. Specifically, the present invention relates to a relay having a function of emitting light to indicate an operation.

2. Related Art

Some conventional relays include an operation indicating light so that an operator easily checks an operation of the relay. The operation indicating light is turned on or off in accordance with an opening or closing operation of the relay. Generally, in order for an operator to easily visually recognize, from an outside of the relay, whether the operation indicating light is in an ON or OFF state, the relay is desirably configured so that the operator can view light of the operation indicating light from a surface side opposite to a lower surface side of a case on which lower surface the relay is provided, that is, from an upper surface side of the case.

According to, for example, a relay disclosed in Patent Literature 1, a light guide path is provided outside of a case (housing) so as to extend in an up-and-down direction along a side surface of the case. An upper surface of the light guide path is level with an upper surface of the case, and serves as a display surface of the light guide path. Light emitted from a light source (light-emitting means) provided in the case (i) enters the light guide path via a lower end part of the light guide path, (ii) is guided in the light guide path, and (iii) then exits from the display surface that is the upper surface of the light guide path. As such, Emission of light from the light source leads to causing the light to exit from the display surface of the light guide path on an upper surface of the relay.

However, according to the relay disclosed in Patent Literature 1, the light which exits from the display surface is less uniform, and has a narrow directional angle. Therefore, even in a case where light exits from the display surface due to emission of the light from the light source, it is difficult to view the light when the relay is observed from an oblique direction (a direction oblique with respect to a direction perpendicular to the upper surface of the relay). Particularly, in a case where a control panel is provided with multiple relays, an operator should observe the relays one after another from a direction perpendicular to upper surfaces of the relays while sequentially shifting a position of the head of the operator along an arrangement of the relays so as to check whether or not each of the relays is emitting light. This is very troublesome.

Note that the upper surface of the case of the relay of Patent Literature 1 is processed so that a diffuse reflection surface is present around the display surface. This diffuse reflection surface diffuses light which leaks from around the display surface so as to improve visibility of the display surface. However, this diffuse reflection surface is provided outside of an optical path of the light which exits from the display surface, and light less leaks from a side surface of the light guide path. Therefore, the diffuse reflection surface is just a mere surface which can emphasize a state of the display surface viewed from the front of the display surface. This diffuse reflection surface does not allow an operator to clearly check, from the oblique direction, a state where the light source emits light.

Patent Literature 2 discloses a relay that includes a light guide path (a member which guides light and causes the light to exit) having a lower end surface that faces a light source and an upper end surface where a lens is provided. However, this lens is not a lens for diffusing light but a lens for collecting light. Therefore, even according to the relay disclosed in Patent Literature 2, it is remarkably difficult to find, from an oblique direction, that the light source emits light, though it is possible to easily find that from a direction perpendicular to an upper surface of a case.

CITATION LIST

Patent Literatures

Patent Literature 1
Japanese Patent No. 4319973
Patent Literature 2
Japanese Examined Utility Model Application Publication Jitsukousho No. 54-183658

SUMMARY

One or more embodiments of the present invention provides a relay which allows an operator to easily visually recognize even from an oblique direction that a light source (operation indicating light) is emitting light. One or more embodiments of the present invention optimizes the length of a light guide path which guides the light of the light source.

A relay according to one or more embodiments of the present invention comprises: a case; a relay body provided in the case; a light source, incorporated in the case, which emits light in accordance with an operation of the relay body; a light guide path which (i) receives, via a first end surface, the light emitted from the light source and (ii) causes the light to exit outward from a second end surface; and a diffusion structure provided in an optical path of the light which exits from the second end surface of the light guide path.

BRIEF DESCRIPTION OF THE DRAWINGS

FIG. 10(A) is a view obtained when the perspective view of FIG. 9 is viewed from a side surface. FIG. 10(B) is a cross-sectional view taken along X-X line of FIG. 10(A). FIG. 10(C) is a cross-sectional view taken along Y-Y line of FIG. 10(B).

DETAILED DESCRIPTION

The following description will discuss embodiments of the present invention with reference to the drawings. Note, however, that the present invention is not limited to the embodiments below, and various modifications in design are available, provided that such modifications do not exceed the scope of the present invention. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Embodiment 1

Figure 1:
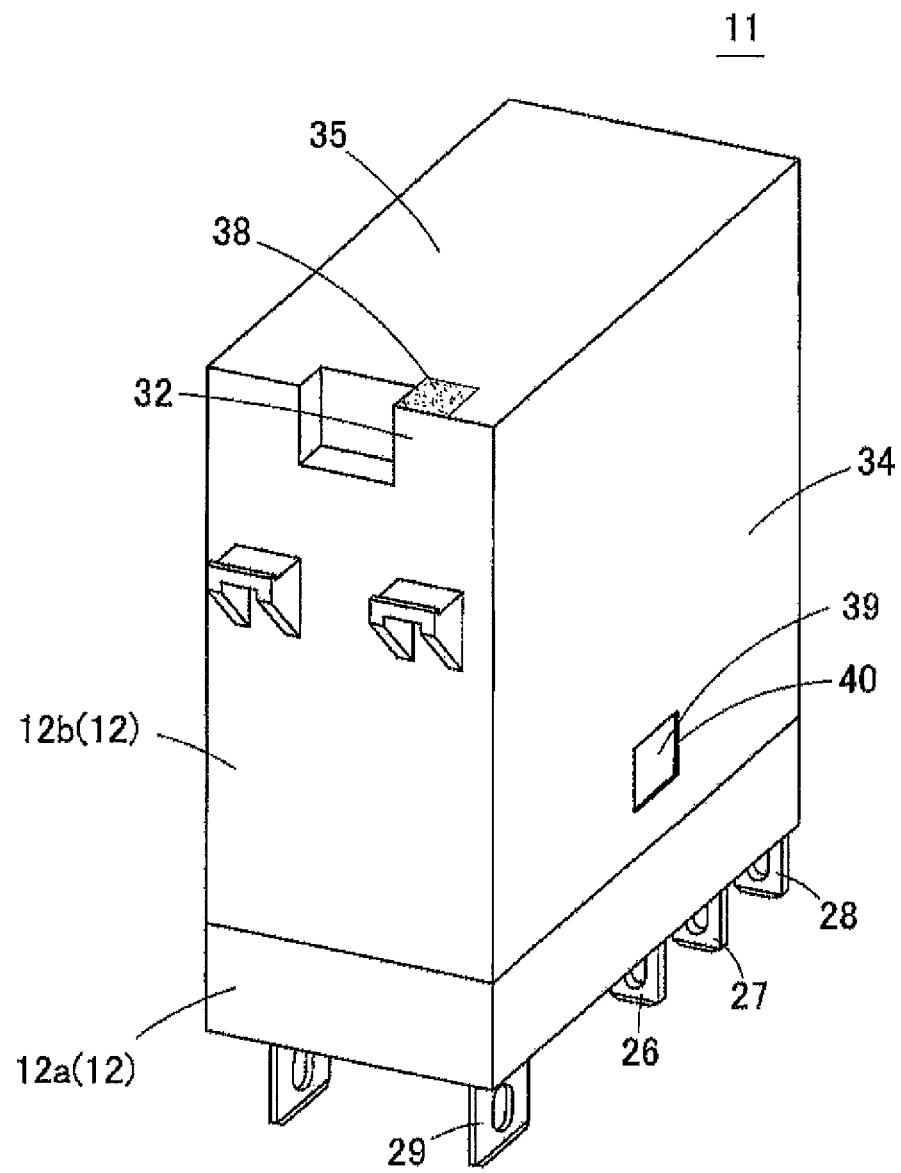
FIG. 1 is a perspective view of a relay of Embodiment 1 of the present invention.
Figure 2:
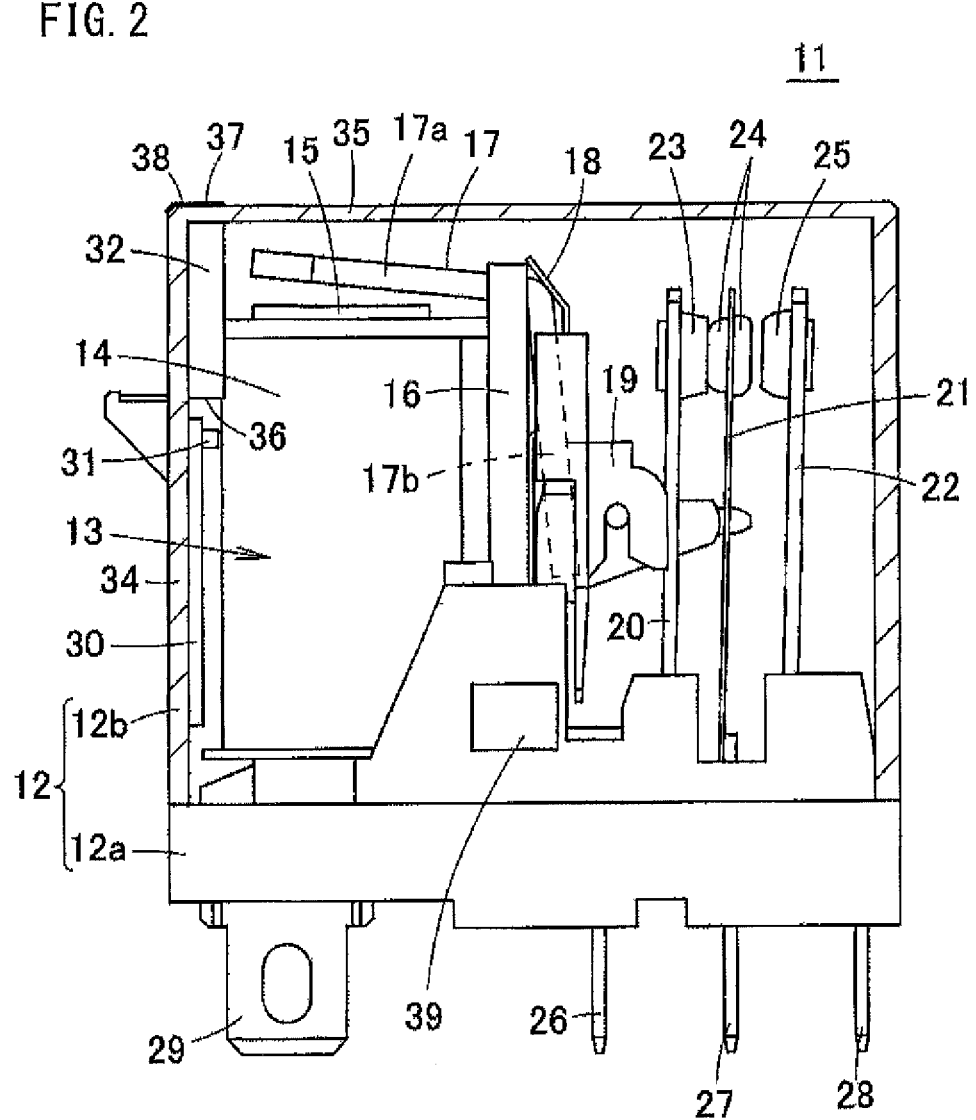
FIG. 2 is a side view of a portion which is cut from the relay illustrated in FIG. 1.
Figure 3:
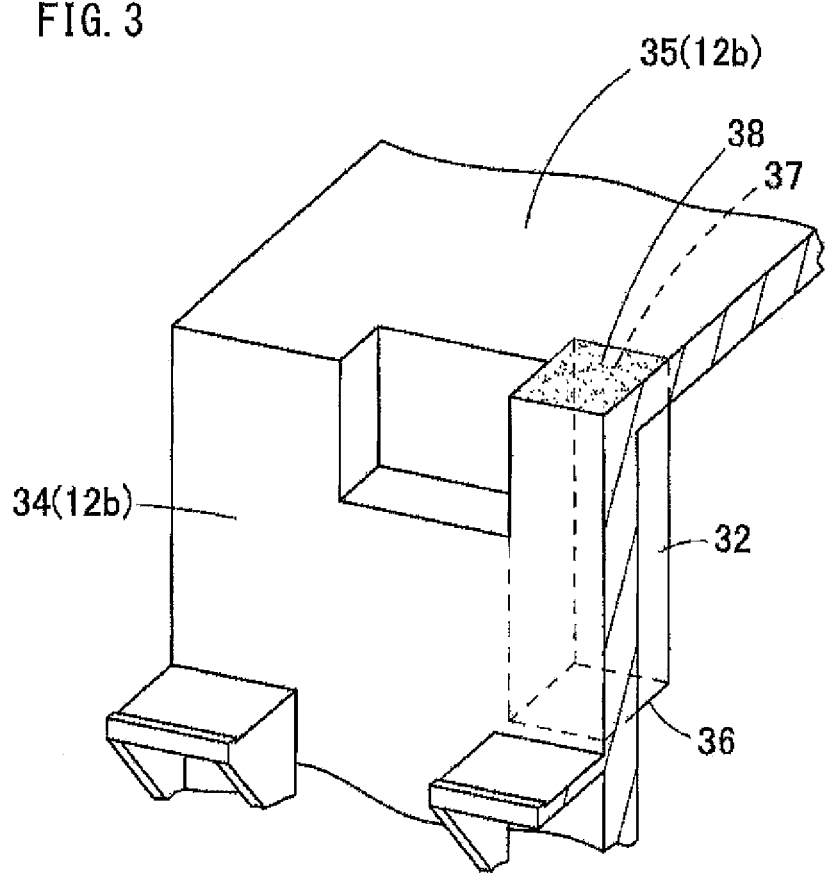
FIG. 3 is a perspective view schematically illustrating a structure of a portion that is cut from the relay illustrated in FIG. 1 which structure is in the vicinity of a light guide path.
Figure 4A:
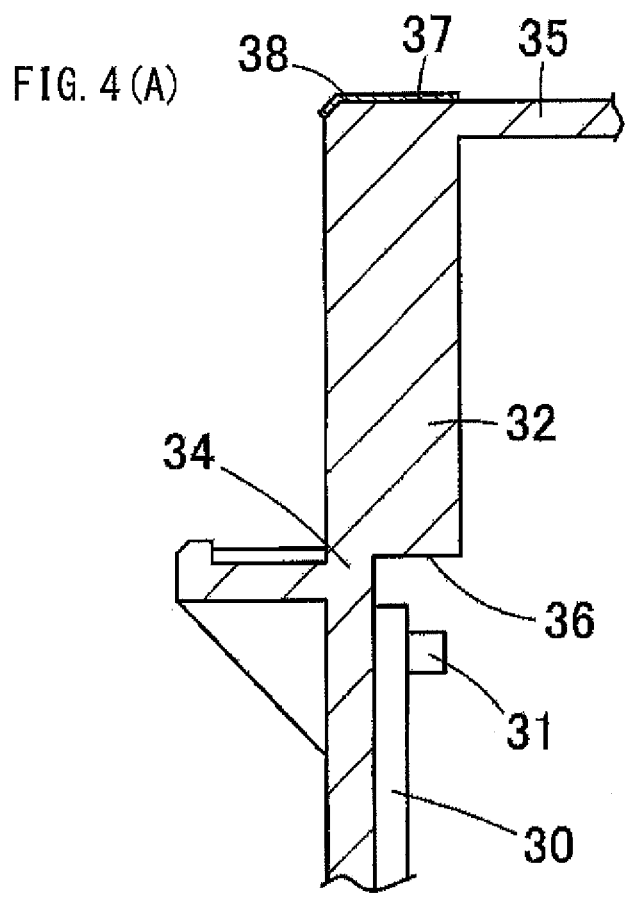
FIG. 4(A) is a longitudinally cross-sectional view of the light guide path.
Figure 4B:
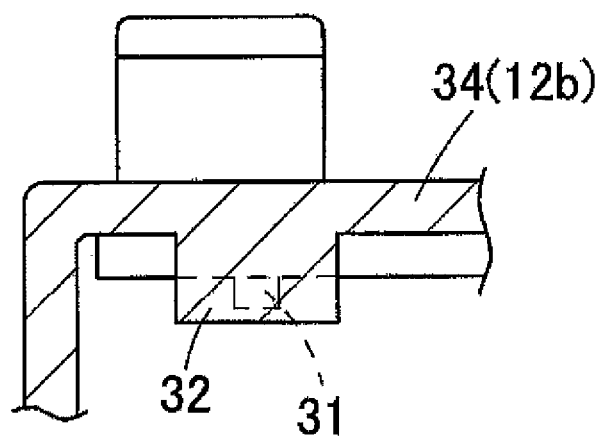
FIG. 4(B) is a horizontally cross-sectional view of the light guide path.

A basic structure of a relay of Embodiment 1 of the present invention will be described below with reference to FIGS. 1 through 3. FIG. 1 is a perspective view illustrating a relay 11 of Embodiment 1 of the present invention. FIG. 2 is a side view of the relay 11 whose housing 12b is cut at a position which does not pass through a light guide path 32. FIG. 3 is a perspective view schematically illustrating a structure of a portion that is cut from the relay 11 which structure is in the vicinity of the light guide path. FIG. 4(A)-4(B) are a longitudinally cross-sectional view and a horizontally cross-sectional view of the light guide path, respectively.

The relay 11 includes (i) a case 12 and (ii) a relay body 13 and an operation indicating light 31 (light source) which are incorporated in the case 12. The case 12 is constituted by (i) a base 12a made from an opaque resin and (ii) a housing 12b made from a transparent resin or a semi-transparent resin. Note, however, that, according to one or more embodiments of the present invention, the housing 12b is a molded product made from a transparent resin having a high refractive index, such as polycarbonate resin, so that, according to one or more embodiments of the present invention, an operating state of the relay body 13 in the case 12 can be found through the housing 12b. The housing 12b may be a molded product made from a semi-transparent resin or a colored transparent resin. It is, however, according to one or more embodiments of the present invention, the semi-transparent resin has a high transparency, and the colored transparent resin be pale in color so that the interior of the relay 11 is visible.

The base 12a has an upper surface where the relay body 13 having a structure illustrated in FIG. 2 is provided. A coil unit 14 (electromagnet) is fixed to the upper surface of the base 12a so as to be upright on the upper surface of the base 12a. A yoke 16 is fixed next to the coil unit 14. An armature 17 is constituted by (i) an adsorption section 17a which extends in a substantially horizontal (lateral) direction and (ii) a swinging section 17b which extends in a substantially vertical (longitudinal) direction. A bend part of the armature 17 between the adsorption section 17a and the swinging section 17b is movably supported by an upper end part of the yoke 16. The adsorption section 17a faces an upper end surface of an iron core 15 of the coil unit 14. The bend part of the armature 17 is held by a spring 8.

In front of the swinging section 17b provided are a plurality of constantly-closing contact springs 20, a plurality of movable contact springs 21, and a plurality of constantly-open contact springs 22 (see FIG. 2). Lower end parts of the contact springs 20, 21 and 22 are fixed to the base 12a. The plurality of movable contact springs 21 are aligned in a direction from the front side of FIG. 2 to the back side of FIG. 2. The same applies to the plurality of constantly-closing contact springs 20 and the plurality of constantly-open contact springs 22. The plurality of movable contact springs 21 are located between the plurality of constantly-closing contact springs 20 and the plurality of constantly-open contact springs 22. Each of the plurality of movable contact springs 21 has an upper end part whose opposite surfaces are provided with respective movable contacts 24. One of the movable contacts 24 faces a constantly-closing contact 23 provided on an upper end part of a constantly-closing terminal 26 corresponding to the each of the plurality of movable contact springs 21. The other of the movable contacts 24 faces a constantly-open contact 25 provided on an upper end part of a constantly-open terminal 28 corresponding to the each of the plurality of movable contact springs 21.

The swinging section 17b has a front surface to which a support 19 made from a synthetic resin is fixed. The support 19 passes through between the plurality of constantly-closing contact springs 20 so as not to come into contact with the plurality of constantly-closing contact springs 20. An end part of the support 19 is bonded to the movable contacts 24.

Constantly-closing terminals 26, common terminals 27, and constantly-open terminals 28 protrude from a lower surface of the base 12a. The constantly-closing terminals 26 are electrically conductive with the plurality of constantly-closing contact springs 20. The common terminals 27 are electrically conductive with the plurality of movable contact springs 21. The constantly-open terminals 28 are electrically conductive with the plurality of constantly-open contact springs 22. An electric current is supplied to the coil unit 14 through a coin terminal 29 which protrudes from the lower surface of the base 12a so that the coil unit 14 is excited.

The base 12a has a side surface from which upper part an engagement section 39 protrudes. The housing 12b has a side surface having a hole 40. The housing 12b is put on the base 12a so as to cover the relay body 13, and the engagement section 39 is fitted into the hole 40. This combines the housing 12b with the base 12a.

An electric current is supplied to the coil unit 14 so that the coil unit 14 is excited (the relay is turned on). This causes the adsorption section 17a of the armature 17 to be adsorbed downward by the iron core 15, thereby moving the swinging section 17b and the support 19 toward the plurality of constantly-closing contact springs 20. This causes the plurality of movable contact springs 21 to move toward the plurality of constantly-open contact springs 22. Consequently, the one of the movable contacts 24 is separated from the constantly-closing contact 23. This opens a loop formed with the constantly-closing terminal 26 and a corresponding one of the common terminals 27. Simultaneously with this separation, the other of the movable contacts 24 comes into contact with the constantly-open contact 25. This closes a loop formed with the corresponding one of the common terminals 27 and the constantly-open terminal 28.

When the coil unit 14 is demagnetized (the relay is turned off), (i) the adsorption section 17a of the armature 17 is separated from the iron core 15, (ii) the swinging section 17b is moved so as to be away from the plurality of constantly-closing contact springs 20 due to elastic force of the spring 18, and (iii) the support 19 is also moved so as to be away from the plurality of constantly-closing contact springs 20. This causes the plurality of movable contact springs 21 to move so as to be away from the plurality of constantly-open contact springs 22. Consequently, the other of the movable contacts 24 is separated from the constantly-open contact 25. This opens the loop formed with the corresponding one of the common terminals 27 and the constantly-open terminal 28. Simultaneously with this separation, the one of the movable contacts 24 comes into contact with the constantly-closing contact 23. This closes the loop formed with the constantly-closing terminal 26 and the corresponding one of the common terminals 27.

The relay 11 according to Embodiment 1 of the present invention includes the operation indicating light 31 for indicating an operating state of the relay 11. The operation indicating light 31 keeps emitting light while the relay 11 is in an ON state, whereas the operation indicating light 31 does not emit light while the relay 11 is in an OFF state. The operation indicating light 31 (LED chip) is mounted on a wiring substrate 30. The wiring substrate 30 is upright on the base 12a in the vicinity of an internal surface of a side wall 34 of the housing 12b. Above the operation indicating light 31, the light guide path 32 is integrated with the housing 12b. The light guide path 32 is made from a transparent resin. A portion of the housing 12b with which portion the light guide path 32 is integrated is also transparent. The light guide path 32 extends in an up-and-down direction above the operation indicating light 31, and has a lower end surface serving as a light-receiving surface 36 (first end surface) and an upper end surface serving as a light exit surface 37 (second end surface) (see FIG. 3, and FIG. 4(A)-4(B)). A side part of the light guide path 32 is integrated with the side wall 34 (or embedded in the side wall 34), and an upper end part of the light guide path 32 is integrated with a top board 35 (or embedded in the top board 35). Therefore, a surface of a side part of the operation indicating light 31 is visible in a surface of the side wall 34, and the light exit surface 37 is visible in an upper surface of the top board 35. A dash line illustrated in FIG. 3 represents a partial contour of the light guide path 32. The light exit surface 37 of the light guide path 32 has a diffusion structure 38 for diffusing light which exits from the light guide path 32. The diffusion structure 38 may be provided so as to be larger than a surface area of the light exit surface 37.

When the relay 11 is turned on, an electric current is supplied to the operation indicating light 31 via the wiring substrate 30, so that the operation indicating light 31 emits light. The light having been emitted upward from the operation indicating light 31 (light having exited from a side surface of the LED chip that is the operation indicating light 31) enters the light guide path 32 through the light-receiving surface 36, and is guided upward while being reflected by a surface of the light guide path 32. Light which has reached the light exit surface 37 is diffused by the diffusion structure 38 and exits outward. By causing light to exit from the light exit surface 37 located in an upper surface of the relay 11, it is possible to visually recognize that the relay 11 is in an ON state. In addition, since light which exits from the light exit surface 37 is diffused by the diffusion structure 38, the light thus diffused has a large directional angle. Therefore, light of the operation indicating light 31 is easily visible not only from above, i.e., from a direction perpendicular to the top board 35 but also from an oblique direction. Visibility of light which exits from the relay 11 is improved.

The diffusion structure 38 is a rough surface (textured surface) obtained by randomly forming a minute convexo-concave shape on the light exit surface 37. According to one or more embodiments of the present invention, this rough surface has a surface roughness of not more than 67 μm and a Haze of not less than 44.7%. Table 1 below shows results brought by evaluating appearances of samples different in surface roughness that falls within a range from 4 μm to 67 μm and in Haze that falls within a range from 15% to 88%. In Table 1, "Good" appearance means that surface roughness of a diffusion structure 38 does not stand out, and light which exits from a light exit surface 37 has a sufficiently large directional angle (i.e., the light which exits from the light exit surface 37 can be visually recognized in a given direction about a direction perpendicular to an upper surface of a relay which given direction is at an angle of not less than 30° with the direction perpendicular to the upper surface of the relay), whereas "Bad" appearance means that surface roughness of a diffusion structure 38 remarkably stands out, and therefore a relay having a diffusion structure 38 whose surface roughness remarkably stands out is not suitable to be commoditized, or it is difficult to visually recognize, in a given direction about a direction perpendicular to an upper surface of a relay which given direction is at an angle of not less than 30° to the direction perpendicular to the upper surface of the relay, light which exits from a light exit surface 37.

TABLE 1

| Surface Roughness (μm) | Haze (%) | Appearance |
| --- | --- | --- |
| 4 | 47.8 | Good |
| 5 | 15.2 | Bad |
| 5 | 44.7 | Good |
| 6.5 | 20.0 | Bad |
| 9.5 | 46.3 | Good |
| 9.5 | 24.9 | Bad |
| 10 | 65.3 | Good |

TABLE 1-continued

| Surface Roughness (μm) | Haze (%) | Appearance |
|---|---|---|
| 16.5 | 50.9 | Good |
| 23 | 76.8 | Good |
| 25 | 86.5 | Good |
| 26 | 66.2 | Good |
| 28 | 78.4 | Good |
| 33 | 72.9 | Good |
| 47 | 83.6 | Good |
| 67 | 88.1 | Good |
| 73 | 88.4 | Bad |

As is clear from Table 1, a light exit surface 37 whose surface roughness is not less than 4 μm and not more than 30 μm and whose Haze is not less than 48% and not more than 87% has a satisfactory appearance.

Figure 5:
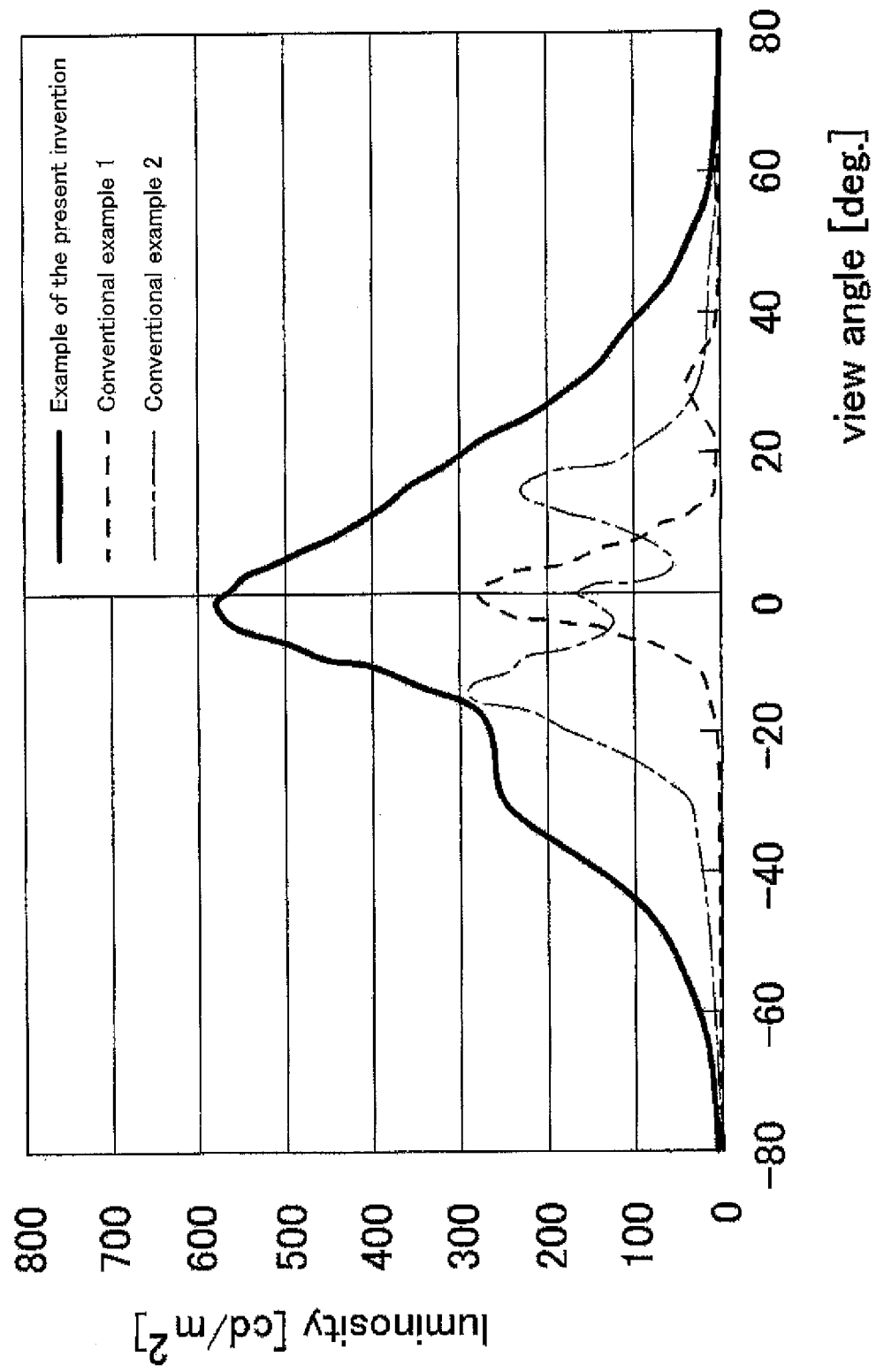
FIG. 5 is a graph illustrating a difference in luminosity among the relay of Embodiment 1 of the present invention and two conventional relays in a case where each of the relay and the conventional relays is observed from different directions.

What will be described below is an effect brought in a case where a diffusion structure 38 having the above characteristics is provided. FIG. 5 is a graph illustrating a luminosity of light which exits from a light exit surface 37 in a case where the light exit surface 37 is viewed from an observation angle (view angle) oblique with respect to a direction perpendicular to the light exit surface 37 (the upper surface of the relay). In FIG. 5, the horizontal axis represents the observation angle, and the vertical axis represents the luminosity. Used were a sample of Embodiment 1 of the present invention, a sample of Conventional Example 1, and a sample of Conventional Example 2. The sample of Embodiment 1 of the present invention is a relay where a light exit surface 37 of a light guide path 32 has a textured diffusion structure 38 whose surface roughness is 20 μm and whose Haze is 70%. The sample of Conventional Example 1 is a relay where no light guide path is provided and only an operation indicating light 31 emits light to indicate an operation. The sample of Conventional Example 2 is a relay which includes a light guide path but does not include any diffusion structure, like the relay disclosed in Patent Literature 1. As is clear from FIG. 5, an observation angle at which an emission state of the sample of Embodiment 1 of the present invention can be visually recognized is remarkably wider than (i) that at which an emission state of the sample of Conventional Example 1 can be visually recognized and (ii) that at which an emission state of the sample of Conventional Example 2 can be visually recognized. Further, according to the sample of Embodiment 1 of the present invention, the light guide path 32 is incorporated in a housing 12b so that the length of an optical path of light guided in the light guide path 32 is shortened. This increases luminosity.

In order to uniform distribution of luminance of light which exits from the light exit surface 37, it is necessary to optimize the length of the light guide path 32 and the dimension of the light-receiving surface 36 so that light having entered the light-receiving surface 36 at a maximum incidence angle is reflected at least twice in the light guide path 32 and then exits from the light exit surface 37. Reflecting, only once, in the light guide path 32, light having entered the light-receiving surface 36 at the maximum incidence angle means that (i) light which exits from the light exit surface 37 is not reflected even once in the light guide path 32 or (ii) light which exits from the light exit surface 37 is reflected only once in the light guide path 32. In this case, the operation indicating light 31 is easily visible through the light exit surface 37, and the distribution is non-uniform. Therefore, in order to uniform the distribution, it is necessary to reflect, in the light guide path 32, many times or at least twice, light having entered the light-receiving surface 36 at the maximum incidence angle.

Figure 6A:
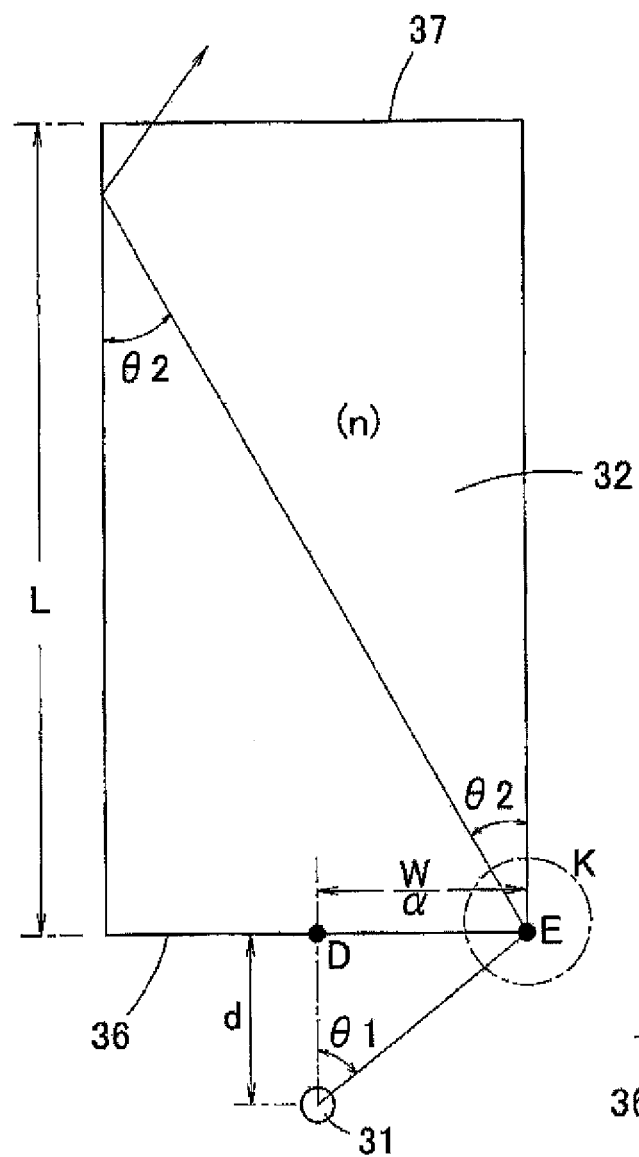
FIGS. 6(A)-(B) are each an explanatory view explaining how to determine an optimal length of the light guide path.
Figure 6B:
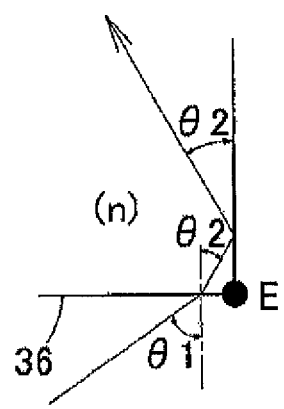

A condition under which light having entered the light-receiving surface 36 at the maximum incidence angle is reflected at least twice in the light guide path 32 can be found as below with reference to FIGS. 6(A)-6(B). FIG. 6(A) is a cross-sectional view along a direction of the length of the light guide path, and illustrates light guided in the light guide path. FIG. 6(B) is an enlarged view illustrating a K part illustrated in FIG. 6(A). Light which enters the light-receiving surface 36 at the maximum incidence angle is light which enters an edge of the light-receiving surface 36. Therefore, Expression 1 below is found from FIG. 6(A).

$$\sin\theta 1 = (W/\alpha)/\sqrt{(W/\alpha)^2 + d^2}$$ (Expression 1)

where (i) d represents a distance between the operation indicating light 31 and the light-receiving surface 36, (ii) W represents a maximum width of the light-receiving surface 36, (iii) W/α represents a maximum distance between the edge of the light-receiving surface 36 and a point D which a perpendicular from the operation indicating light 31 to the light-receiving surface 36 reaches, and (iv) θ1 represents the maximum incidence angle at which light enters the light-receiving surface 36 (see FIG. 6(A)).

Figure 7:
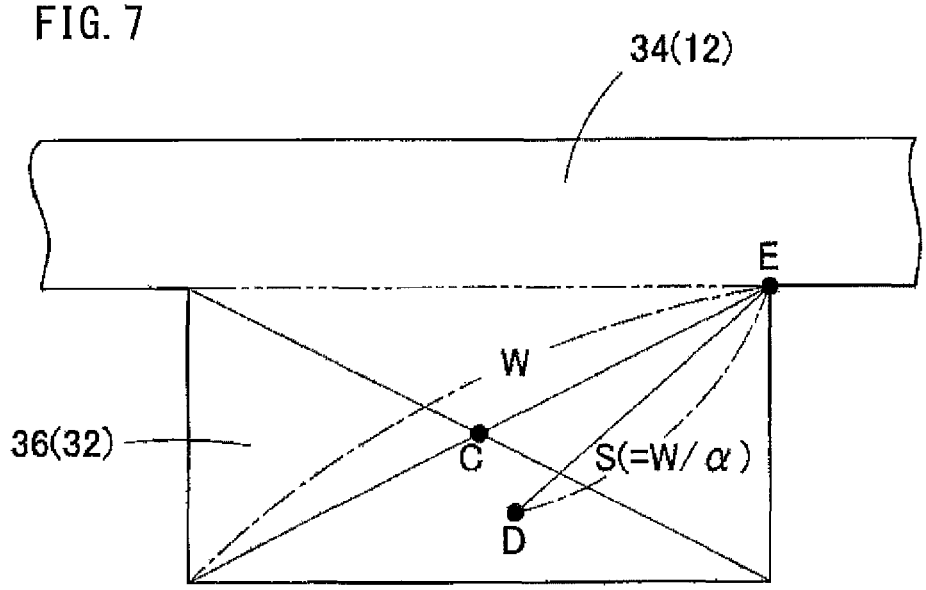
FIG. 7 is a view illustrating a maximum width of a light-receiving surface of the light guide path, and an explanatory view explaining how to determine W/α in a case where a light source is outside of the center of the light-receiving surface.

Note here that the length L of the light guide path 32 is the length of the light guide path 32 from the light-receiving surface 36 to the light exit surface 37. The light guide path 32 may be in close contact with the side wall 34 of the case 12, or may be integrated with the side wall 34 of the case 12. Even in this case, neither the light guide path 32 nor the light-receiving surface 36 includes the thickness of the side wall 34 of the case 12 in working out Expressions 1 through 5. Therefore, the maximum width W of the light-receiving surface 36 corresponds to the length of each diagonal line of the light-receiving surface 36 (which does not include the thickness of the side wall 34) (see FIG. 7). According to one or more embodiments of the present invention, the operation indicating light 31 is provided so that the perpendicular from the operation indicating light 31 to the light-receiving surface 36 reaches an intersection C of the diagonal lines of the light-receiving surface 36. In this case, the maximum distance between (i) the edge of the light-receiving surface 36 and (ii) the point D (=the intersection C) which the perpendicular from the operation indicating light 31 to the light-receiving surface 36 reaches is W/2 (i.e., α=2).

On the other hand, there is a case where the operation indicating light 31 is provided so that the perpendicular from the operation indicating light 31 to the light-receiving surface 36 reaches a position slightly distant from the intersection C of the diagonal lines. In this case, a distance S from the point D to a corner E that is most distant from the point D is the maximum distance between the point D and the edge of the light-receiving surface 36, which point D the perpendicular from the operation indicating light 31 to the light-receiving surface 36 reaches (an intersection where the perpendicular from the operation indicating light 31 to the light-receiving surface 36 intersects the light-receiving surface 36). Therefore, α=W/S in this case. Further, in this case, FIG. 6(A) is a cross section taken along the point D and the corner E, and the maximum incidence angle θ1 is an incidence angle at which light from the operation indicating light 31 enters the corner E.

Note that the α (=W/S) falls within a range of 1<α≤2. The reason for this is as follows. In a case where the point D is distant from the intersection C in FIG. 7, the distance W/α between the point D and the corner E (point E) is not shorter than half as long as the length W of the each diagonal line.

That is, W/α≥W/2. Accordingly, α≤2. Further, the distance W/α between the point D and the corner E is shorter than the length W of the each diagonal line. That is, W/α<W. Accordingly, α>1. Thus, the α (=W/S) falls within the range of 1<α≤2.

Light which enters the light guide path 32 via the edge of the light-receiving surface 36 is refracted by the light-receiving surface 36, enters the light guide path 32, and is immediately subjected to a first reflection by a side surface of the light guide path 32 (see FIG. 6(B)). A relation between θ1 and θ2 is represented by Expression 2 below.

$$\sin θ1 = n \cdot \sin θ2 \quad \text{(Expression 2)}$$

where θ2 represents an angle between light guided in the light guide path 32 and the side surface of the light guide path 32.

By combining Expression 1 with Expression 2, Expression 3 below is found.

$$n \cdot \sin θ2 = W / \sqrt{W^2 + α^2 d^2} \quad \text{(Expression 3)}$$

In order that light having entered the light-receiving surface 36 at the maximum incidence angle, i.e., light having entered the light guide path 32 via an edge of the light guide path 32 is reflected at least twice in the light guide path 32 and then exits from the light exit surface 37, the length L of the light guide path 32 needs only to be determined so that a second reflection is carried out in the light guide path 32. A condition under which the length L of the light guide path 32 is determined so that the second reflection is carried out in the light guide path 32 is represented by Expression 4 below. Note that n·cos θ2>1.

$$L > W / \tan θ2 \quad \text{(Expression 4)}$$

By deleting θ2 from Expression 4 by use of Expression 3 obtained is a condition under which the light having entered the light-receiving surface 36 at the maximum incidence angle is reflected at least twice in the light guide path 32 and then exits from the light exit surface 37. This condition is represented by Expression 5 below.

$$L > \sqrt{(n^2-1)W^2 + α^2 n^2 d^2} \quad \text{(Expression 5)}$$

In a case where the length of the light guide path 32 meets the condition (Expression 5), the distribution of luminance of light which exits from the light exit surface 37 is uniform. Even in a case where light exits from only part of the upper surface of the relay 11, the light which exits from the part is satisfactorily visible. Product quality is improved.

Modification of Embodiment 1

A modification of Embodiment 1 of the present invention will be described below. Embodiment 1 has described a case where the diffusion structure 38 is the rough surface obtained by randomly forming the minute convexoconcave shape on the light exit surface 37. The diffusion structure 38 may be a diffusion sheet bonded to the light exit surface 37 (not illustrated). Alternatively, the diffusion structure 38 may be light-diffusing particles dispersed in the vicinity of the light exit surface 37 in the light guide path 32 (not illustrated).

Embodiment 2

Figure 8:
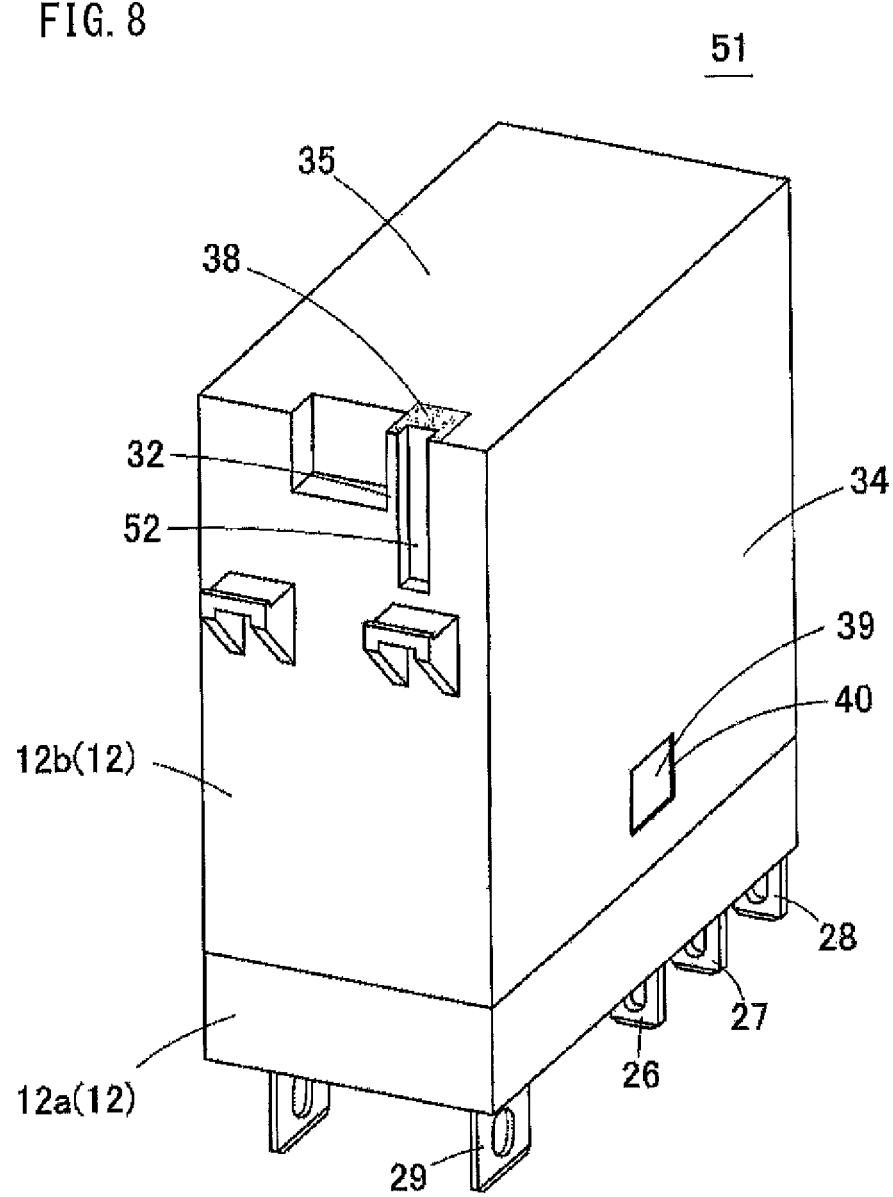
FIG. 8 is a perspective view of a relay of Embodiment 2 of the present invention.
Figure 9:
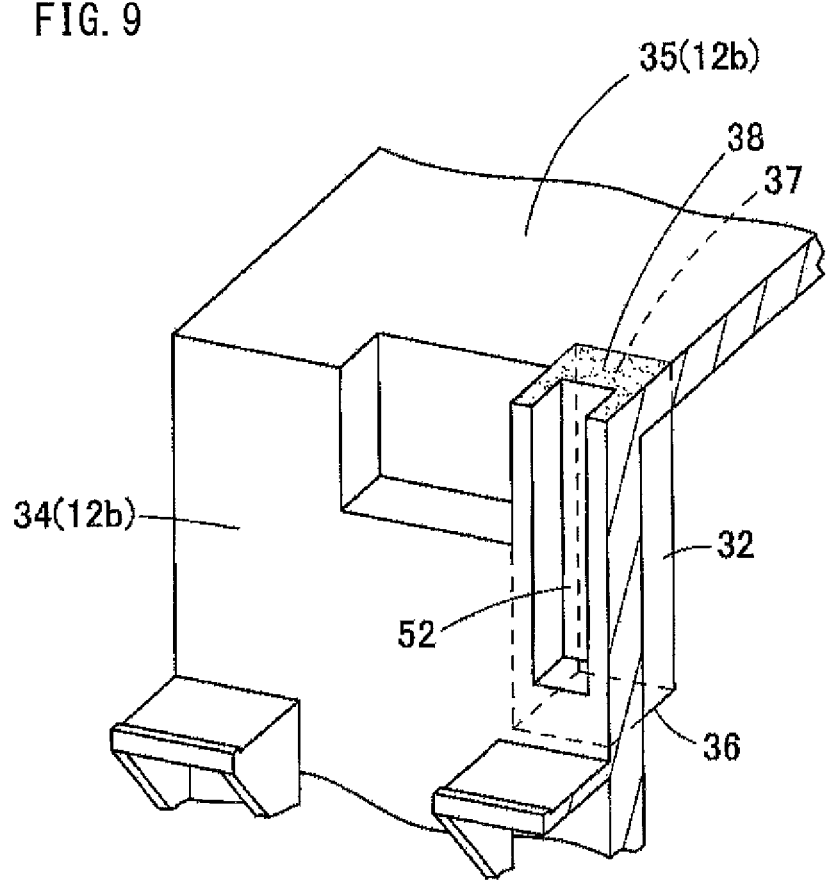
FIG. 9 is a perspective view schematically illustrating a structure of a portion that is cut from the relay illustrated in FIG. 8 which structure is in the vicinity of a light guide path.

FIG. 8 is a perspective view of a relay 51 of Embodiment 2 of the present invention. FIG. 9 is a perspective view illustrating a structure of a portion which is cut from the relay 51 which structure is in the vicinity of a light guide path. FIG. 10(A) is a view obtained when the perspective view of FIG. 9 is viewed from a side surface. FIG. 10(B) is a cross-sectional view taken along X-X line of FIG. 10(A). FIG. 10(C) is a cross-sectional view taken along Y-Y line of FIG. 10(B).

The relay 51 of Embodiment 2 is characterized in having a thickness reduction part 52 in a light guide path 32. Except for this point, the relay 51 of Embodiment 2 is identical in structure to the relay 11 of Embodiment 1. Therefore, identical reference numerals are given to members having respective functions identical to those illustrated in the drawings of Embodiment 1, and descriptions of such members are omitted in Embodiment 2.

As illustrated in FIG. 8, the relay 51 has a groove-shaped thickness reduction part 52 which extends in an up-and-down direction. The thickness reduction part 52 is provided in an outer side surface of the light guide path 32, i.e., in a side surface of the light guide path 32 which side surface corresponds to an outer surface of a side wall 34. Therefore, the thickness reduction part 52 is visible in a surface of a housing 12b. As illustrated in FIGS. 9 and 10, an upper end of the thickness reduction part 52 reaches a light exit surface 37 (i.e., an upper surface of a top board 35), whereas the thickness reduction part 52 does not reach a light-receiving surface 36, i.e., the thickness reduction part 52 is not provided in the light-receiving surface 36.

Figure 11A:
FIG. 11(A) is a photograph of a light guide path having a void in a case where the light guide path is viewed from the front of the light guide path.
Figure 11B:
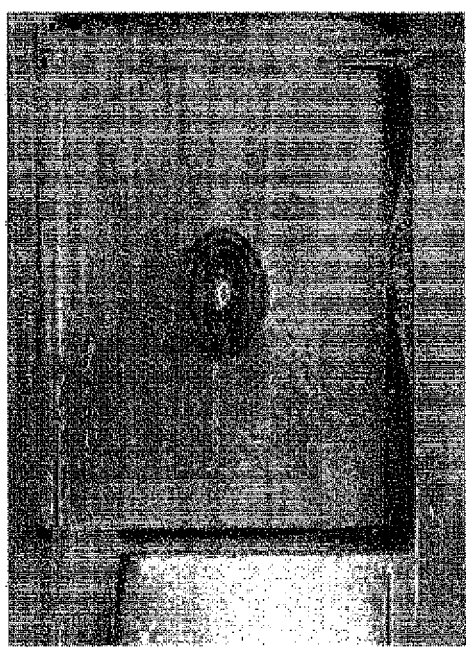
FIG. 11(B) is a photograph of the light guide path having the void in a case where the light guide path is viewed from a side surface of the light guide path.
Figure 11C:
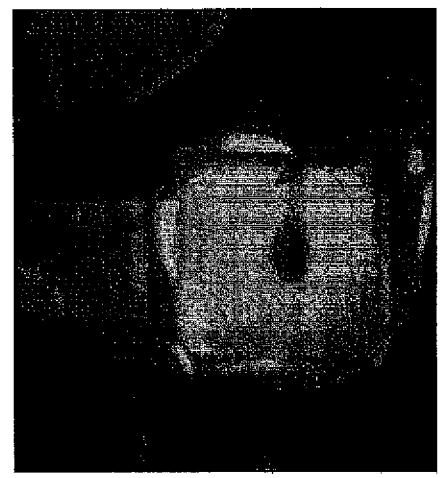
FIG. 11(C) is a photograph of a light exit surface from which light is exiting through the light guide path having the void.

As a light guide path 32 which does not have the above-described thickness reduction part 52 is thickened, a void and/or a sink mark are/is easily caused in the light guide path 32. Photographs of FIG. 11 show a void (air bubble) made in a light guide path 32 having no thickness reduction part 52. FIG. 11(A) illustrates a state in a case where the light guide path 32 is viewed from the front of the light guide path 32. A pear-shaped void is found in the light guide path 32 of FIG. 11(A). FIG. 11(B) illustrates a state in a case where the light guide path 32 is viewed from a side surface of the light guide path 32. An elliptical void is found in the light guide path 32 of FIG. 11(B). FIG. 11(C) is a plain view illustrating a state in a case where an operation indicating light 31 emits light below the light guide path 32 having the void. In the case where (i) the operation indicating light 31 emits light below the light guide path 32 having the void and (ii) the light guide path 32 is viewed from above, a shadow of the void is found as shown in FIG. 11(C). Quality of a relay including the light guide path 32 having the void is deteriorated.

As a light guide path 32 is thickened, volume shrinkage of the light guide path 32 increases. This causes a sink mark in a surface of the light guide path 32. This sink mark dents the surface of the light guide path 32, whereby quality of the light guide path 32 is deteriorated. Non-uniform volume shrinkage of the light guide path 32 will probably cause luminance of light which exits from a light exit surface 37 to be distributed non-uniformly.

Figure 12A:
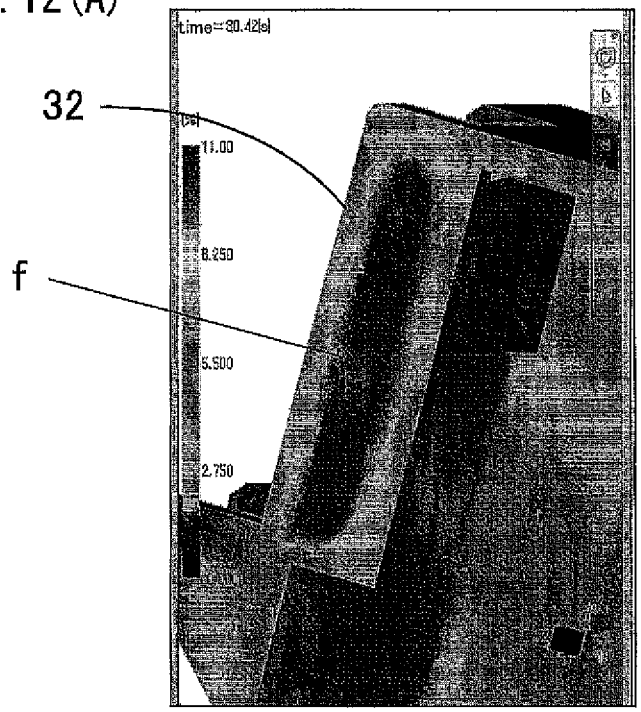
FIG. 12(A) is a view illustrating distribution of a volume shrinkage ratio of a light guide path having no thickness reduction part.
Figure 12B:
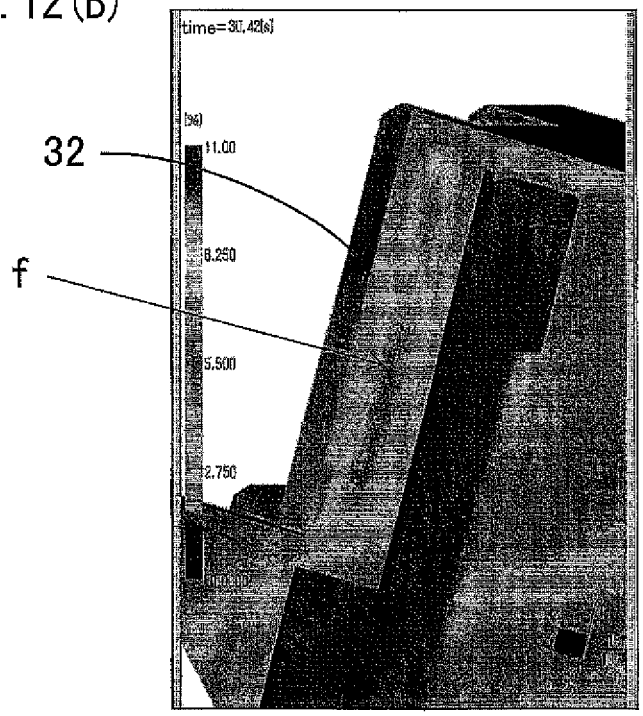
FIG. 12(B) is a view illustrating distribution of a volume shrinkage ratio of a light guide path having a thickness reduction part.

On the other hand, a light guide path 32 having a thickness reduction part 52 has a reduced thickness. Therefore, the light guide path 32 is unlikely to cause a void and a sink mark. Quality of a relay 51 including the light guide path 32 is improved. FIG. 12(A) shows distribution of a volume shrinkage ratio f of a light guide path 32 having no thickness reduction part. As is clear from FIG. 12(A), a remarkable volume shrinkage is extensively caused. In contrast, the light guide path 32 having the thickness reduction part 52 has a low volume shrinkage ratio f, and is unlikely to cause a sink mark (see FIG. 12(B)). In FIGS. 12(A)-12(B), a portion deeper in white has a lower volume shrinkage ratio f, whereas a portion deeper in black has a higher volume shrinkage ratio f. Note, however, that, in a case where the thickness reduction part 52 is also provided in a light-receiving surface 36, a surface area of the light-receiving surface 36 is reduced, light to be taken in the light guide path 32 is reduced, and consequently luminance of light which exits from a light exit surface 37 is reduced. Therefore, the thickness reduction part 52 is not provided in the light-receiving surface 36.

The above-described thickness reduction part is shaped to eliminate a void and a sink mark which are caused during molding. A basic condition for causing neither a void nor a sink mark is a uniform thickness of a resin molded product. The resin molded product having the uniform thickness is unlikely to cause (i) a flow of the resin during molding or (ii) a local deformation or a void (air bubble) due to curing shrinkage. The light guide path 32 of one or more embodiments of the present invention may be likely to cause a sink mark and/or a void due to a local increase in volume of the light guide path 32. This may sometimes deteriorate an appearance of the relay 51 which is emitting light. Therefore, providing a thickness reduction part 52 to reduce the volume of a resin thereby reducing occurrence of a sink mark and a void is effective for improving quality. Note, however, that a small void or sink mark does not impair the appearance. Therefore, such a small void or sink mark is allowed to remain.

Figure 13:
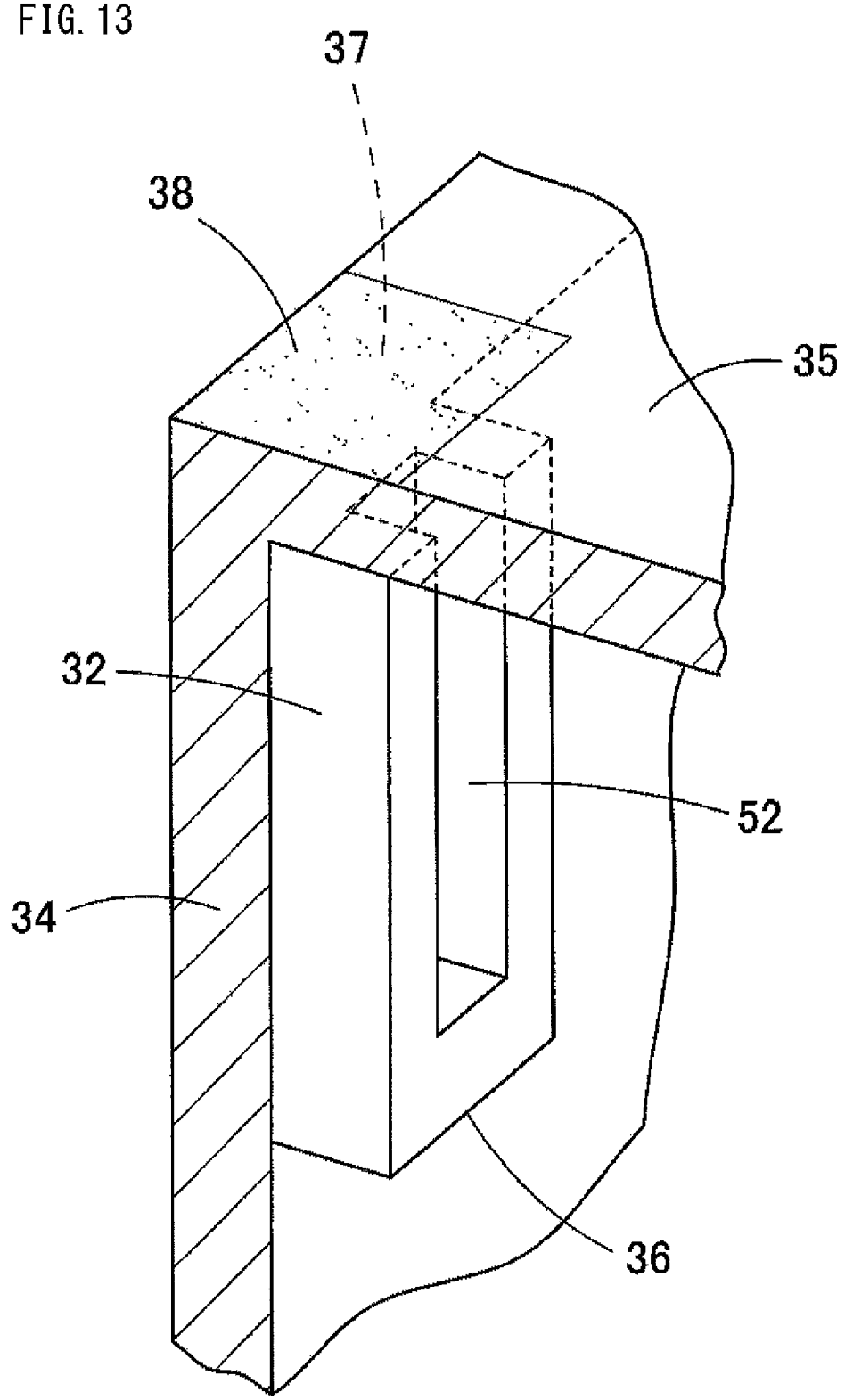
FIG. 13 is a perspective view illustrating a modification of Example 2 of the present invention.

Modification of Embodiment 2

Where a thickness reduction part 52 is provided is not limited to an outer side surface of a light guide path 32. The thickness reduction part 52 may be provided in, for example, an inner side surface of the light guide path 32 (see FIG. 13). Alternatively, the thickness reduction part 52 may be provided in a right and/or left side surface of the light guide path 32 (a side surface of the light guide path 32 which side surface is perpendicular to an outer surface of a side wall 34) (not illustrated).

Other Embodiments

Figure 14A:
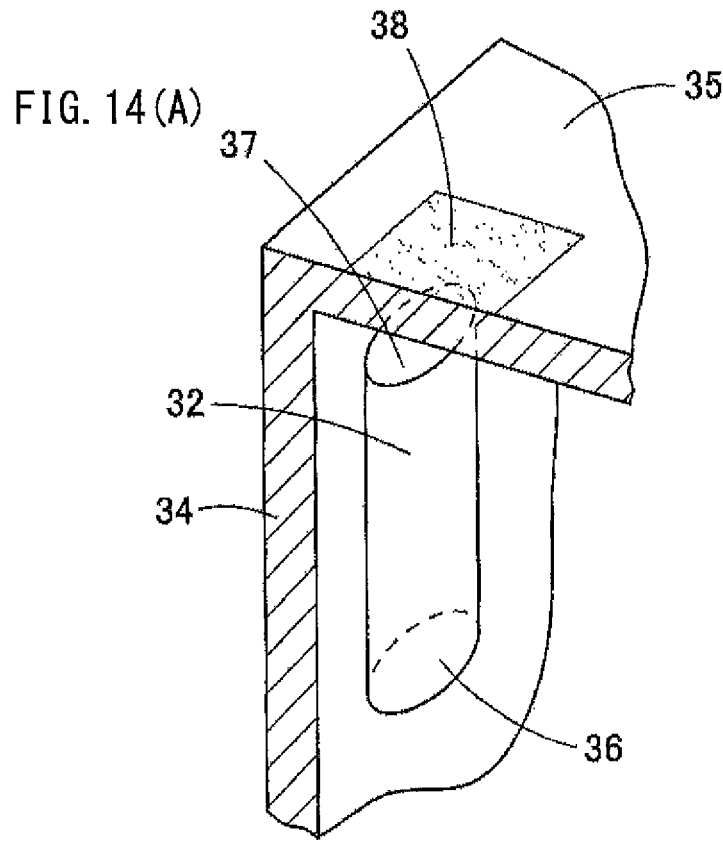
FIG. 14(A)-(B) are a perspective view and a side view, respectively, which illustrate a structure of a light guide path of another modification.
Figure 14B:
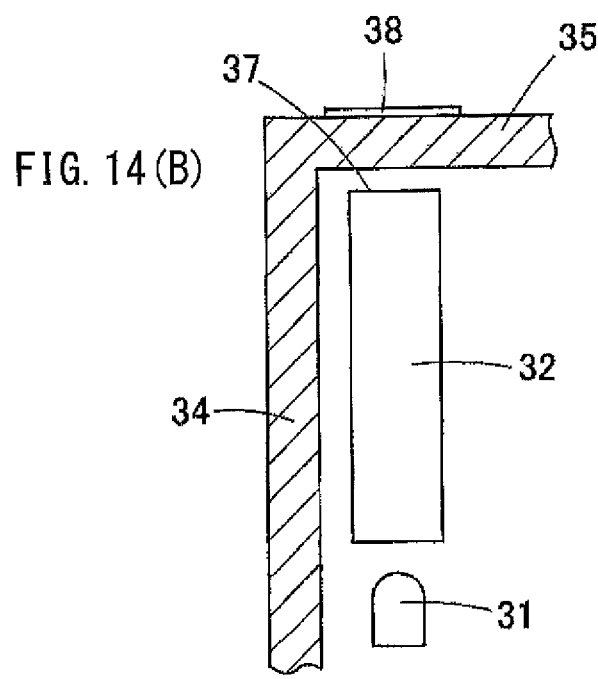

FIGS. 14(A)-14(B) are a perspective view and a side view, respectively, which illustrate a structure of a light guide path 32 of a relay of another embodiment of the present invention. The light guide path 32 may be independent from a side wall 34 of a housing 12b and a top board 35, and may be isolated from the housing 12b (see FIGS. 14(A)-14(B)). In this case, a diffusion structure 38 may be provided on a light exit surface 37, or may be provided on an upper or lower surface of the top board 35 so as to face the light exit surface 37 (see FIGS. 14(A)-14(B)). Further, the light guide path 32 is not limited to be in a rectangular column shape, but may be in a cylindrical column shape or in an elliptical column shape.

Figure 15:
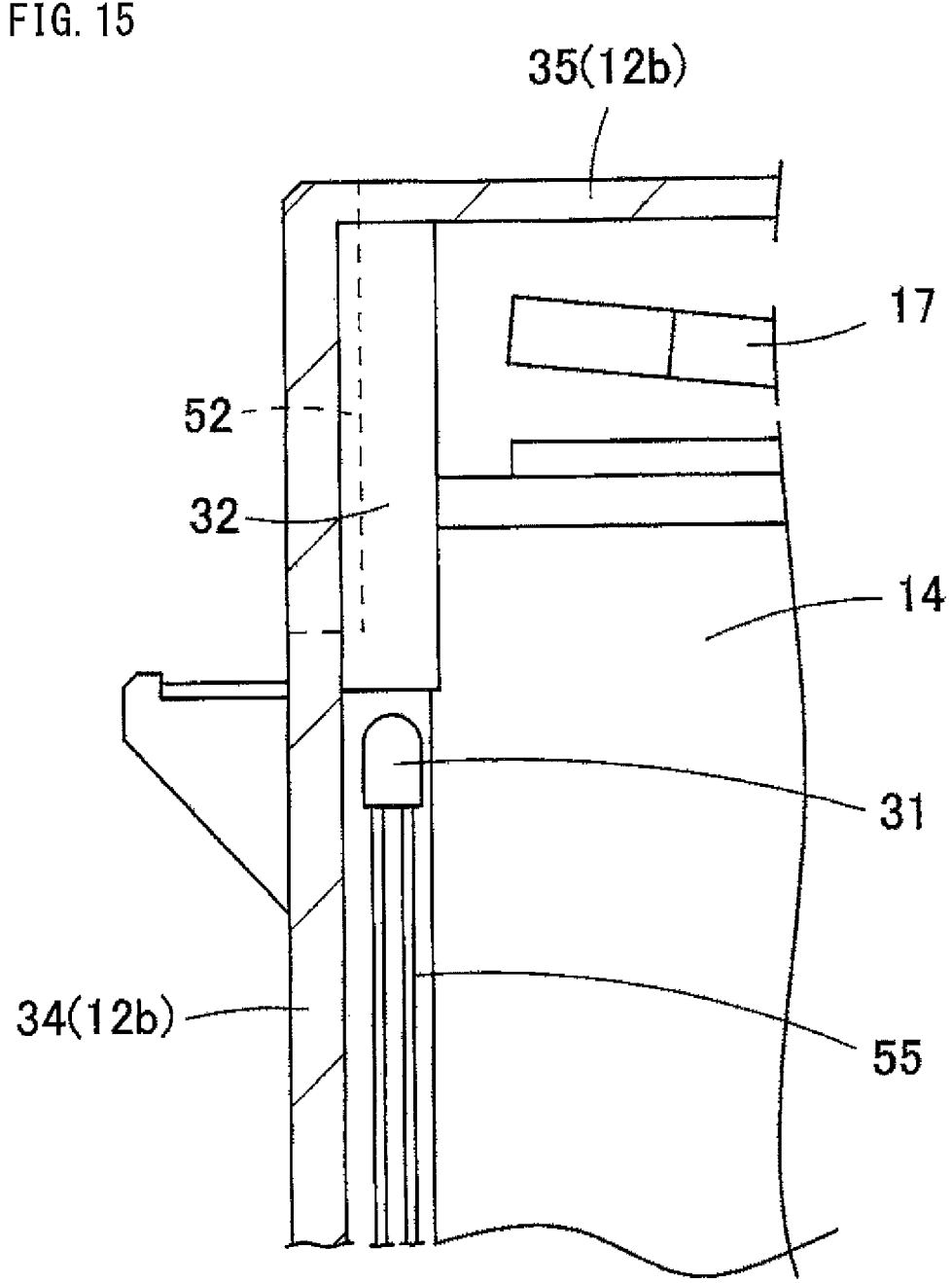
FIG. 15 is a view partially illustrating a relay of yet another modification.

FIG. 15 is a cross-sectional view partially illustrating a relay of yet another embodiment of the present invention. According to this embodiment, a bullet-shaped operation indicating light 31 (LED element) is provided so as to face a lower surface (light-receiving surface 36) of a light guide path 32. This operation indicating light 31 is supported above a base 12a by a lead pin 55 having a moderate rigidity.

Figure 16:
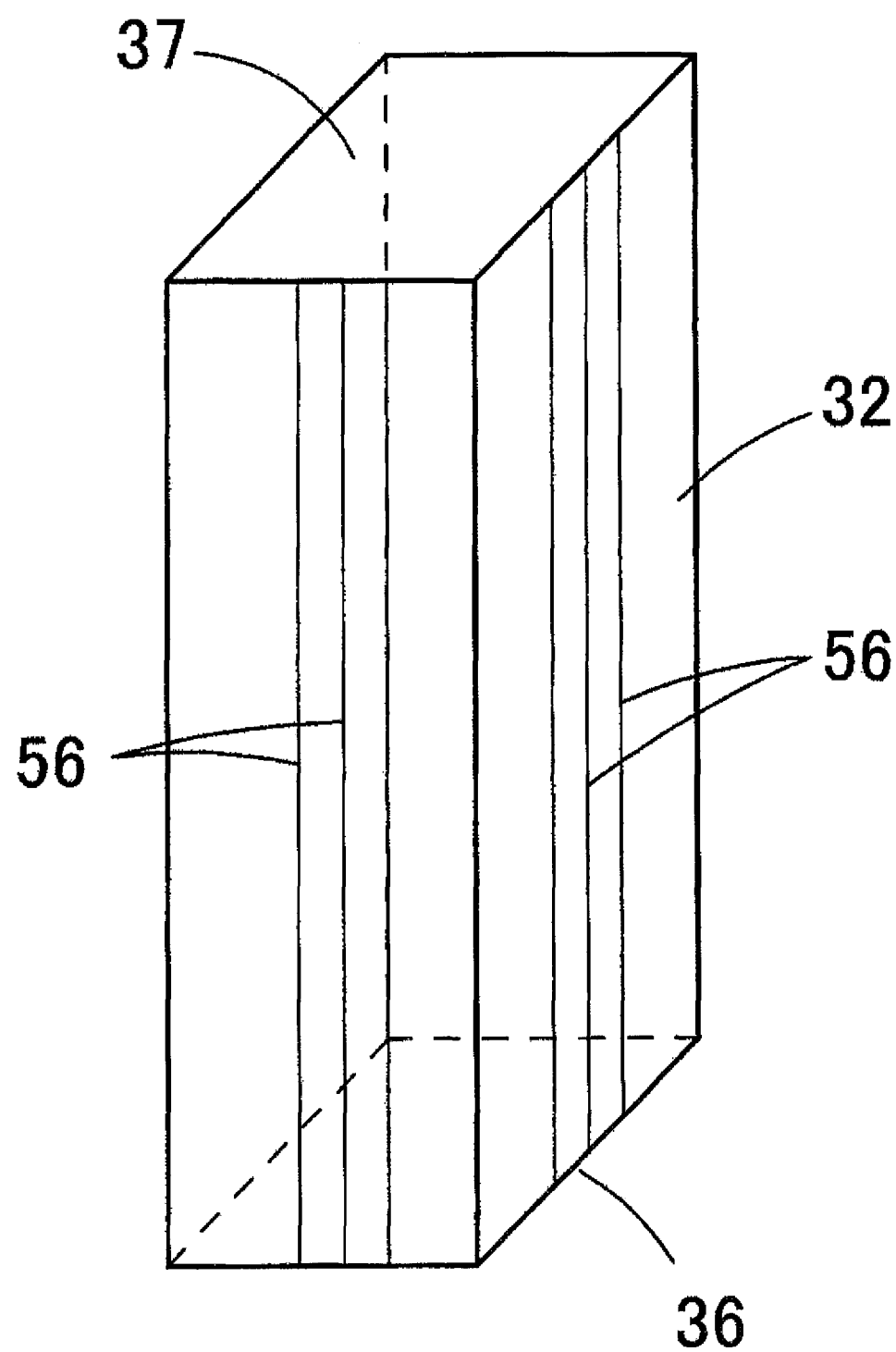
FIG. 16 is a perspective view illustrating a light guide path of yet another modification.

FIG. 16 is a perspective view illustrating a light guide path 32 of yet another embodiment of the present invention. The light guide path 32 of this embodiment has side surfaces in each of which at least one very thin groove 56 is formed.

The at least one very thin groove 53 may be shaped into a groove such as a V-shaped groove, a circular groove, or a rectangular groove.

Note that the light guide path 32 is allowed to be provided outside of a housing 12b.

A relay according to one or more embodiments of the present invention comprises: a case; a relay body provided in the case; a light source, incorporated in the case, which emits light in accordance with an operation of the relay body; a light guide path which (i) receives, via a first end surface, the light emitted from the light source and (ii) causes the light to exit outward from a second end surface; and a diffusion structure provided in an optical path of the light which exits from the second end surface of the light guide path.

The relay according to one or more embodiments of the present invention includes the diffusion structure provided in the optical path of the light (main light) which exits from the second end surface (light exit surface) of the light guide path that guides the light emitted from the light source. Therefore, the relay can diffuse the light which exits from the second end surface. This makes it easy to visually recognize, even from a direction oblique with respect to a direction perpendicular to the second end surface, the light which exits from the second end surface.

The relay according to one or more embodiments of the present invention is further configured so that the light emitted from the light source (i) enters the first end surface of the light guide path at a maximum incidence angle, (ii) is reflected at least twice by an interface of the light guide path, and then (iii) exits from the second end surface. This configuration makes it possible to uniform distribution of luminance of the light which exits from the second end surface.

The relay according to one or more embodiments of the present invention is further configured to meet an inequality $$L > \sqrt{(n^2-1)W^2 + \alpha^2 n^2 d^2}$$

where L represents a length of the light guide path, W represents a maximum width of the first end surface, W/α represents a maximum distance between an edge of the first end surface and a point which a perpendicular from the light source to the first end surface reaches, d represents a distance between the light source and the first end surface, and n represents a refractive index of the light guide path. This configuration makes it possible to uniform distribution of luminance of the light which exits from the second end surface.

The relay according to one or more embodiments of the present invention is further configured so that the light guide path has a thickness reduction part. This configuration makes it difficult to cause a sink mark and a void in the light guide path.

The relay according to one or more embodiments of the present invention is further configured so that the light source is provided so as to face the first end surface of the light guide path, and the thickness reduction part does not reach the first end surface. This configuration makes it possible to prevent a surface area of the first end surface from being reduced due to the thickness reduction part. It is therefore possible to prevent light of the light source from being less taken in the light guide path due to the thickness reduction part. This ultimately can prevent decrease in the luminance of the light which exits from the second end surface.

The relay according to one or more embodiments of the present invention is further configured so that the diffusion structure is a rough surface whose Haze is not less than 44.7%. This configuration makes it possible to optimize how much the diffusion structure diffuses light.

A relay according to one or more embodiments of the present invention is configured so that the diffusion structure is the rough surface having a surface roughness R_max of not more than 67 μm. This configuration makes it possible to optimize how much the diffusion structure diffuses light. This configuration also makes it easy to visually recognize, even at a large angle to a direction perpendicular to an upper surface of the relay, the light which exits from the second end surface.

The relay according to one or more embodiments of the present invention is further configured so that the light guide path is located in the case. This configuration makes it difficult to damage or break the light guide path.

The relay according to one or more embodiments of the present invention is further configured so that the light guide path is integrated with the case. This configuration makes it possible to eliminate a component molding step including a step of assembling the light guide path.

The relay according to one or more embodiments of the present invention may be further configured, for example, so that at least part of a top board of the case is transparent, the light guide path extends in an up-and-down direction, a side surface of the light guide path corresponds to an outer surface of a side wall of the case, and the second end surface of the light guide path corresponds to an upper surface of the at least part of the top board, the at least part being transparent.

The relay according to one or more embodiments of the present invention is further configured so that the light source is mounted on a wiring substrate provided in the case. This configuration allows the light source to share the wiring substrate with the relay.

The relay according to one or more embodiments of the present invention is further configured so that the light source is provided in the case, and the light source is connected to an electricity supply line. According to the configuration, no wiring substrate is used. This makes it possible to reduce an internal space of the relay.

The relay according to one or more embodiments of the present invention may further be configured so that the second end surface has the diffusion structure, the diffusion structure is a diffusion sheet provided on the second end surface, or the diffusion structure is light-diffusing particles dispersed in the light guide path.

Note that the present invention includes an embodiment derived from a proper combination of the above-described features, and the present invention also includes various combinations of the features.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST 11 and 51: Relay
12: Case
12a: Base
12b: Housing
13: Relay body
20: Constantly-closing contact spring
21: Movable contact spring
22: Constantly-open contact spring
23: Constantly-closing contact
24: Movable contact
25: Constantly-open contact
30: Wiring substrate
31: Operation indicating light
32: Light guide path
34: Side wall
35: Top board
36: Light-receiving surface
37: Light exit surface
38: Diffusion structure
52: Thickness reduction part
55: Lead pin

The invention claimed is:

1. A relay, comprising:
a case;
a relay body disposed in the case;
a light source disposed in the case that emits light in accordance with an operation of the relay body;
a light guide path that receives, via a first end surface, the light emitted from the light source, and causes the light to exit outward from a second end surface; and
a diffusion structure disposed in an optical path of the light which exits from the second end surface of the light guide path,
wherein the relay meets the inequality $$L > \sqrt{(n^2-1)W^2 + \alpha^2 n^2 d^2},$$

wherein L represents a length of the light guide path, W represents a maximum width of the first end surface, W/α represents a maximum distance between an edge of the first end surface and a point which a perpendicular from the light source to the first end surface reaches, d represents a distance between the light source and the first end surface, and n represents a refractive index of the light guide path.

2. The relay as set forth in claim 1, wherein the light emitted from the light source enters the first end surface of the light guide path at a maximum incidence angle, is reflected at least twice by an interface of the light guide path, and then exits from the second end surface.

3. The relay as set forth in claim 1, wherein the light guide path has a thickness reduction part.

4. The relay as set forth in claim 3, wherein the light source is provided so as to face the first end surface of the light guide path, and the thickness reduction part does not reach the first end surface.

5. The relay as set forth in claim 1, wherein the diffusion structure is a rough surface whose Haze is not less than 44.7%.

6. The relay as set forth in claim 5, wherein the diffusion structure is the rough surface having a surface roughness R_max of not more than 67 μm.

7. The relay as set forth in claim 1, wherein the light guide path is located in the case.

8. The relay as set forth in claim 1, wherein the light guide path is integrated with the case.

9. The relay as set forth in claim 8,
wherein at least part of a top board of the case is transparent,
wherein the light guide path extends in an up-and-down direction,
wherein a side surface of the light guide path corresponds to an outer surface of a side wall of the case, and wherein the second end surface of the light guide path corresponds to an upper surface of the at least part of the top board, the at least part being transparent.

10. The relay as set forth in claim 1, wherein the light source is mounted on a wiring substrate provided in the case.

11. The relay as set forth in claim 1, wherein the light source is provided in the case, and the light source is connected to an electricity supply line.

12. The relay as set forth in claim 1, wherein the second end surface has the diffusion structure.

13. The relay as set forth in claim 1, wherein the diffusion structure is a diffusion sheet provided on the second end surface.

14. The relay as set forth in claim 1, wherein the diffusion structure is light-diffusing particles dispersed in the light guide path.

* * * * *